United States Patent [19]

D'Alelio

[11] 4,026,904
[45] May 31, 1977

[54] AROMATIC EPOXY-TERMINATED POLYIMIDES

[75] Inventor: Gaetano F. D'Alelio, South Bend, Ind.

[73] Assignee: University of Notre Dame, South Bend, Ind.

[22] Filed: Feb. 25, 1976

[21] Appl. No.: 661,332

Related U.S. Application Data

[63] Continuation of Ser. No. 511,421, Oct. 2, 1974, abandoned.

[52] U.S. Cl. .................. 260/326 C; 260/326 N; 260/857 PA
[51] Int. Cl.² ................................... C07D 209/34
[58] Field of Search .............. 260/326 C, 326 N

[56] References Cited

UNITED STATES PATENTS 3,700,617  10/1972  Golownia et al. ............. 260/326 C Primary Examiner—Ethel G. Love

[57] ABSTRACT

Aromatic epoxy-terminated aromatic polyimides and processes for their preparation are provided. The epoxidized polyimides are prepared by epoxidizing an olefinically unsaturated aromatic imide of the formula:

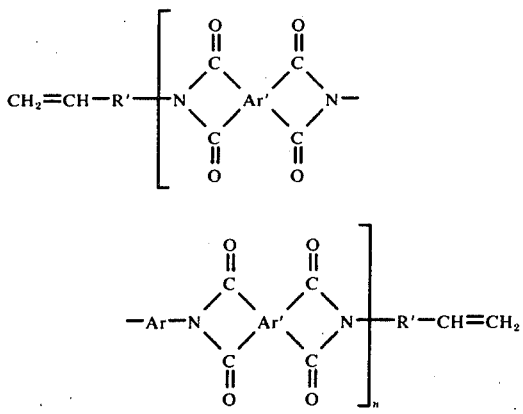

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical,
R' is a divalent aromatic hydrocarbon radical, and
$n$ is a positive integer of at least 1.

Preferably, the starting aromatic imide is a styrene-terminated aromatic imide wherein $n$ is at least 4 which is epoxidized with a per-acid.

3 Claims, No Drawings

AROMATIC EPOXY-TERMINATED POLYIMIDES

CROSS REFERENCE TO RELATED APPLICATIONS

This application is a Continuation of Ser. No. 511,421, filed Oct. 2, 1974, now abandoned.

BACKGROUND OF THE INVENTION

1. Field of Invention

This invention relates to polyimides and processes for their preparation and more particularly to aromatic epoxy-terminated aromatic polyimides and process for their preparation.

2. Prior Art

U.S. Pat. No. 3,700,617, issued Oct. 24, 1972, to R. F. Golownia et al., describes epoxidized allyl terminated, low molecular weight polyimides (or imideamides). When $n$ in the formula of Golownia et al. is greater than 2, epoxidized allyl terminated polymers are no longer covered.

The inventor does not know of any prior art describing epoxidized styryl end-capped polyimide.

SUMMARY OF THE INVENTION

According to the present invention, there is provided an epoxidized aromatic polyimide having the structural formula:

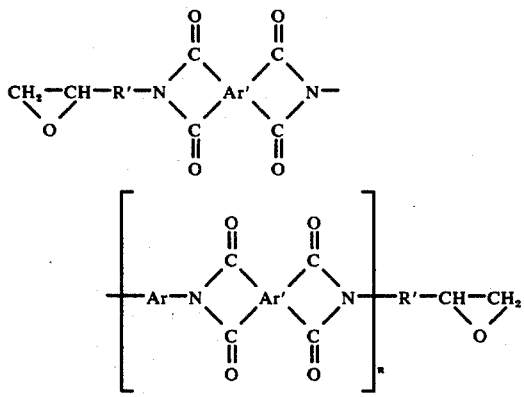

wherein
- Ar is a divalent aromatic organic radical,
- Ar' is a tetravalent aromatic organic radical, the four carbonyl groups being attached directly to separate carbon atoms and each pair of carbonyl groups being attached to adjacent carbon atoms in the Ar' radical,
- R' is a divalent aromatic hydrocarbon radical, and
- $n$ is a positive integer of at least 1.

There is also provided a process for preparing the above-mentioned polyimide which comprises epoxidizing an olefinically-terminated aromatic imide such as a styrene-terminated aromatic imide.

DETAILED DESCRIPTION OF THE INVENTION

The aromatic epoxy-terminated aromatic polyimides of the present invention are prepared by epoxidizing an olefinically unsaturated aromatic imide. Epoxidation is conveniently achieved by the use of per-acids; however any of the methods given in Chem. Rev. 45, 1–68 (1949) are suitable for the preparation of the epoxides of this invention.

Olefinically unsaturated aromatic imides useful in the invention are prepared as described in my copending application Ser. No. 363,800, filed May 25, 1973, now U.S. Pat. No. 3,998,786, the description of which is incorporated by reference. These aromatic imides have the structural formula:

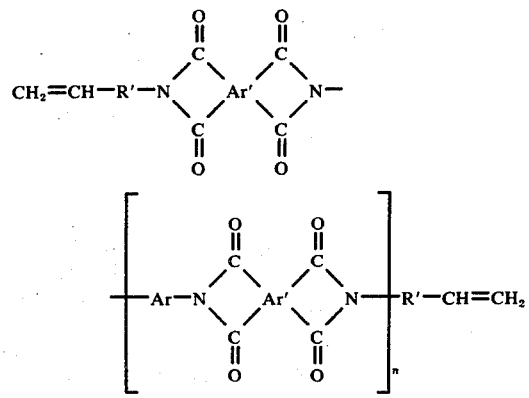

wherein
- Ar is a divalent aromatic organic radical,
- Ar' is a tetravalent aromatic organic radical, the four carbonyl groups being attached directly to separate carbon atoms and each pair of carbonyl groups being attached to adjacent carbon atoms in the Ar' radical,
- R' is a divalent aromatic hydrocarbon radical, and
- $n$ is a positive integer of 1–100 preferably at least 4, e.g., 4 to 100 and most preferably 4 to 20.

Typically, the olefinic unsaturation is present through a styrene-terminated aromatic imide.

As described in my aforesaid application Ser. No. 363,800, the olefinically unsaturated aromatic imides are prepared by reacting in an aromatic phenol solvent such as m-cresol using an organic azeotroping agent such as benzene $m + 1$ moles of an aromatic dianhydride of the formula:

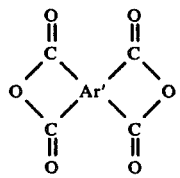

wherein Ar' is as defined previously, with $m$ moles of an aromatic diamine of the formula:

wherein Ar is as defined previously, and 2 moles of an aromatic monoamine of the formula:

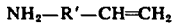

wherein R' is as defined previously.

Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride and the like. Preferred dianhydrides are 3,3',4,4'-benzophenonetetracarboxylic dianhydride, pyromellitic anhydride and 1,4,5,8-naphthalenetetracarboxylic and dianhydride with the first one most preferred.

Preferred aromatic diamines are those wherein Ar is a divalent benzenoid radical selected from the group consisting of

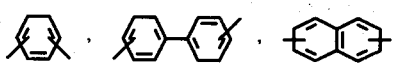

and multiples thereof connected to each other by R, e.g.,

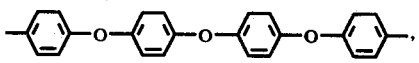

wherein R is alkylene of 1 to 3 carbon atoms,

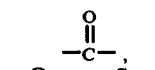

—O—, —S—, —CH=CH, and SO$_2$. Other useful R groups are

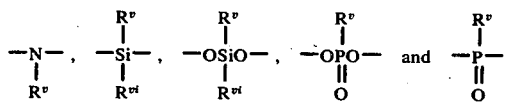

wherein R$^v$ and R$^{vi}$ are each alkyl or aryl containing 1 to 6 carbon atoms, e.g., methyl, ethyl, propyl, hexyl, n-butyl and i-butyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 4,4'-diaminostilbene, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diamino-diphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminophenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene.

The aromatic monoamine, NH$_2$—R'—CH=CH$_2$ is preferably styryl amine, NH$_2$C$_6$H$_4$CH=CH$_2$; however R$^1$ can be aryl, alkaryl or aralkyl of 6 to 12 carbon atoms. Other preferred monoamines are NH$_2$CH$_2$C$_6$H$_4$CH=CH$_2$, NH$_2$C$_6$H$_4$CH$_2$CH=CH$_2$, NH$_2$C$_{10}$H$_6$CH=CH$_2$, and NH$_2$C$_{10}$H$_6$CH$_2$CH=CH$_2$.

Epoxidation of the terminal styryl groups, for example, is conveniently carried out by reacting the groups, with a per-organic acid (two oxygen atoms directly linked in the carboxyl group) at a temperature and for a time sufficient to epoxidize the olefinic groups. The per acid can either be added to the reaction or generated in situ. At least two moles per mole of aromatic imide are required. Temperatures within the range of 5° to about 100° C. can be used, preferably about ambient (~20° C.) to 80° C. Of course, the temperature and time needed to conduct the epoxidation will vary if the reaction is conducted under a sub or super atmospheric pressure.

The organic per acid has the formula

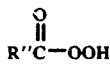

wherein R" is a hydrocarbon or substituted hydrocarbon radical of 2 to 12 carbon atoms. For example, the radical can be alkyl such as $CH_3-$, $C_2H_5-$, $C_3H_7-$, $C_8H_{17}-$, $C_{12}H_{25}-$; alkene such as $CH_3CH=CH-$, $CH_3CH=CH\ CH_2-$, and $C_6H_5CH=CH-$; cycloalkyl such as cyclopentane and cyclohexane; cycloalkylene such as cyclohexene and cyclopentene; an aromatic such as aryl, alkaryl and aralkyl. The aromatic radicals can be $-C_6H_5$, $-C_6H_4CH_3$, $-C_6H_3(CH_3)_2$, $-C_6H_5C_2H_3$, $-C_{10}H_7$, $-C_{10}H_6CH_3$, $-C_{10}H_5(CH_3)_2$, $-CH_2C_6H_5$, and $-CH_2C_6H_4CH_3$, etc. The substituted hydrocarbon radicals are preferably halogenated, such as $Cl_3C-$, $Cl_3C_6H_2-$ etc. The preferred per acids are perbenzoic acid and peracetic acid.

The reaction is usually performed in added solvents. Any solvent can be used provided the aromatic imide is soluble in it. The specific solvent will depend on the particular aromatic imide used. In most cases, the solvent is an aprotic organic compound having a dielectric constant between 35 and 45, preferably one which is water soluble. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)ether, N,N,N',N'-tetramethylfuraramide, methylsuccinonitrile, N,N-dimethylcyanoacetamide, N,N-dimethyl-β-cyano-propionamide, N-formyl-piperidine and butyrolactone, etc.

Of the solvents, dimethylacetamide is most preferred. Other preferred solvents are dimethylformamide, N-methyl pyrrolidone, dimethyl sulfoxide, butyrolactone and caprolactam.

In many cases, non-aprotic solvents can be used. For example, xylene, phenol, anisole, benzonitrile, acetophenone, methylphenylether, methylene chloride, chloroform, carbon tetrachloride, or mixtures of these with each other, the aprotic solvents or with relatively poor solvents such as benzene, toluene, cyclohexane, cyclohexene, dioxane, butyl cellosolve and the like.

The epoxidized products can be used as prepared in solution or isolated as a solid product by either evaporating the solvent or by use of a precipitating non-solvent for the polymer. Illustrative precipitating liquids, but not limited thereto, are alcohols such as methanol, ethanol, isopropanol, ethylene glycol, propylene glycol; esters such as ethyl formate, ethyl acetate, ethylene glycol diacetate; ethers such as methyl cellosolve, butyl cellosolve, ethyl cellosolve acetate; hydrocarbons such as benzene, toluene, xylene, cyclohexane, cyclohexene; aromatic ethers such as methyl phenyl ether, hydroxy ethyl phenyl ether, and water. Water and methanol are preferred.

As epoxy compounds, the products of the invention can be utilized or cured by any of the conventional methods used for the current commercially available epoxy resins. For example, they can be reacted and cured with polycarboxylic acids and anhydrides; aliphatic, cycloaliphatic and aromatic polyamides; or catalytically cured by tertiary amines such as tributyl amine, dimethylbenzyl aniline, tribenzyl amine. These and other curing reagents are disclosed in the art such as the epoxy handbooks published by the Dow Chemical Company. Suitable catalysts are also the amine-boron trifluoride complexes such as morpholine, pyridine or dimethylamine complexes.

The invention can be further understood by referring to the following examples in which parts and percentages are by weight unless otherwise indicated.

EXAMPLE 1

This example uses a styrene-terminated oligomeric polyimide (BTAS-12) prepared using the procedure of Example 15 of my copending application Ser. No. 363,800, filed May 25, 1973. BTAS-12 was prepared using 5 moles of 3,3',4,4'-benzophenonetetracarboxylic acid dianhydride (BTCA), 4 moles of 1,3-di(3-aminophenoxy) benzene (DAPB-3,3) and 2 moles of m-aminostyrene (AS).

In a 25-ml. round-bottom flask equipped with a capillary air bubbler and a condenser was placed BTAS-12 (1.907 g.), 1 g. of benzaldehyde and 10 ml. of methylene chloride. A slow stream of air was bubbled through the solution at ambient temperature for 24 hours to generate perbenzoic acid in situ. Ultraviolet light from a UV lamp (Mineralight; UVS-11) was directed at the flask.

After 24 hours, the methylene chloride was removed by evaporation and the solid was washed five times with anhydrous ether. After vacuum-drying the solid at ambient temperature for 24 hours, there was obtained 1.339 g. of a styrene oxide terminated aromatic polyimide (BTSO-2) as a yellow powder. On a Fisher-Johns apparatus, BTSO-2 melted over the range 190°–205° C. The drop melt, taken as the lowest temperature at which a sample would completely melt when it was dropped onto the preheated stage of a Fisher-Johns apparatus, was 195° C.

Small samples of BTSO-2 were placed into small test tubes, the tubes were flushed with nitrogen and capped with a nitrogen-filled balloon. Then the tubes were placed into a preheated metal block. After 1 hour, the tubes were removed and allowed to cool. Reactions were also performed in which curing agents were incorporated. The pertinent data, including curing agents and reaction temperatures, and the thermal stability data of the cured polymers are summarized in Table I.

TABLE I

| Agent | Cure Block Temp.° C. | TGA Inflection Pt.° C. | TGA % Weight Loss at 500° C. |
|---|---|---|---|
| None | 225 | 580 | 2 |
| 5% wt. Bz$_3$N | 225 | 565 | 4 |
| 1:1 mole m-PDA | 225 | 595 | 3 |

Bz$_3$N = Tribenzylamine.
m-PDA = m-phenylene diamine

Similar results are obtained when an equivalent amount of peracetic acid is substituted for perbenzoic acid generated in situ.

EXAMPLE 2

Example 1 is repeated using the styrene-terminated oligomeric polyimide prepared in Example 15 of my aforesaid copending application, i.e., BTCA, DAPB-3,4 and AS in a molar ratio of 9:8:2. Similar melt temperatures and cured products are obtained.

EXAMPLE 3

Example 1 is repeated using as the styrene-terminated oligomeric polyimide an imide prepared by reacting 5 moles of BTCA; 4 moles of p-phenylene diamine and 2 moles of AS according to the procedure of my aforesaid copending application. The desired epoxy derivative is obtained. Similar thermal stabilizers are obtained in the cured products.

EXAMPLE 4

A styrene-terminated oligomeric polyimide is prepared from 3 moles of pyromellitic dianhydride, 2 moles of oxydianiline and 2 moles of AS according to the procedure of my aforesaid copending application. This aromatic imide is used in a repeat of Example 1 with similar results.

EXAMPLE 5

In a round bottom flask equipped with a condenser and electric heating mantle is placed BTAS-12 (1.907 g.), 10 ml of methylene chloride and 1.5 g. of perbenzoic acid and the mixture refluxed for 24 hours. The diepoxide is then isolated by the procedure of Example 1. The properties of the product are substantially equivalent to that of Example 1.

EXAMPLE 6

The procedure of Example 5 is repeated using an equivalent amount of 50% peracetic acid and similar results are obtained.

EXAMPLE 7

The procedure of Example 5 is repeated using N,N-dimethyl acetamide as the solvent, per-trichlorobenzoic acid (2.53 g.) as the epoxidizing agent at 50° C. for 16 hours. Similar results are obtained.

What is claimed is:

1. An epoxidized aromatic polyimide having the structural formula:

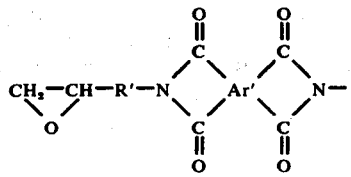

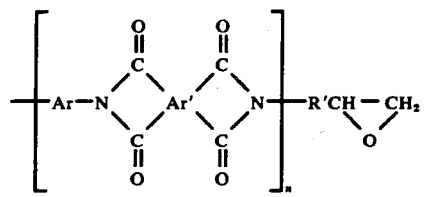

wherein
Ar is a divalent radical selected from the group consisting of

and multiples thereof not exceeding four connected to each other by R, wherein R is alkylene of 1 to 3 carbon atoms,

—O—, —S—, —CH=CH— or —SO$_2$—,
Ar' is a tetravalent aromatic organic radical selected from the group consisting of

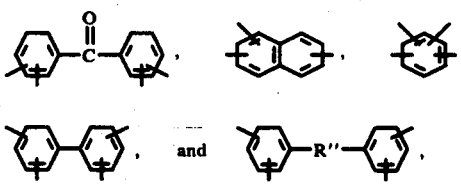

wherein R" is —CH$_2$—, —C$_2$H$_4$—, —C$_3$H$_6$—, —O— or —SO$_2$—,
R' is a divalent radical selected from the group consisting of —C$_6$H$_4$—, —CH$_2$C$_6$H$_4$—, C$_{10}$H$_6$—, and —CH$_2$C$_{10}$H$_6$—, and
n is a positive integer of 1 to 100.

2. The epoxidized polyimide of claim 1 wherein Ar' is selected from the group consisting of

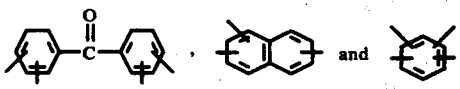

and
n is 4 to 100.

3. The epoxidized polyimide of claim 2 wherein R' is phenylene.

* * * * *